Figure 1:
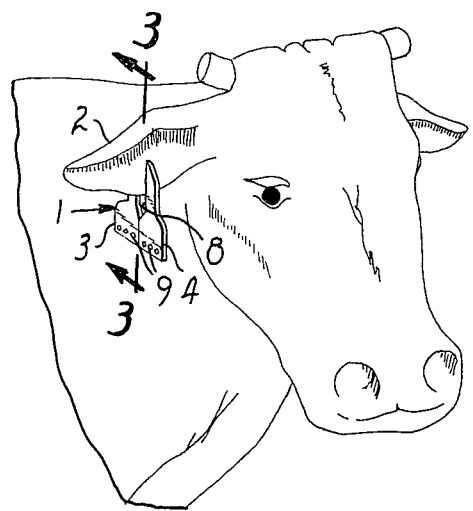

United States Patent [19]
Melin

[11] 3,956,840
[45] May 18, 1976

[54] PERFORATED ANIMAL IDENTIFICATION TAG

[76] Inventor: John E. Melin, 1508 Culberston, Worland, Wyo. 82401

[22] Filed: Apr. 15, 1974

[21] Appl. No.: 460,824

[52] U.S. Cl. ................................................ 40/301
[51] Int. Cl.² ......................................... G09F 3/00
[58] Field of Search ............... 119/135; 3/1; 40/2.2, 40/2 F, 2 R, 300, 301, 302; 128/329

[56] References Cited
UNITED STATES PATENTS

| | | | |
|---|---|---|---|
| 1,318,283 | 10/1919 | Johnston | 40/300 |
| 1,788,004 | 1/1931 | Williams | 40/2 R |
| 2,563,572 | 8/1951 | Alonso | 40/300 X |
| 3,067,534 | 12/1962 | Paxton | 40/2 R X |
| 3,257,668 | 6/1966 | Braley | 3/1 |
| 3,334,434 | 8/1967 | Melin | 119/135 X |
| 3,673,717 | 7/1972 | Latsbacher | 40/2 R |

*Primary Examiner*—Louis G. Mancene
*Assistant Examiner*—Wenceslao J. Contreras
*Attorney, Agent, or Firm*—Alexander, Sell, Steldt & DeLaHunt

[57] ABSTRACT

A tag for identification of animals comprising a portion for extending through the tissue of the animal and an identification means connected thereto, and having at least one perforation in said portion for extending through the tissue of the animal, said perforation allowing for animal tissue growth into said portion.

1 Claim, 3 Drawing Figures

PERFORATED ANIMAL IDENTIFICATION TAG

This invention relates to an animal identification tag, particularly an animal identification tag containing at least one perforation to allow for tissue growth into the tag.

A wide variety of animal identification tags are known. Examples are those disclosed in U.S. Pat. Nos. 2,972,828, 3,357,122, 3,400,479, 3,765,133, 2,675,357, 3,512,289, 3,552,051, 3,334,434, and Des. 229,571. Retention of the tag in the animal is one important consideration in using any of the various types, there being a considerable difference in retention time from one tag to another. In all instances, however, improved retention has been sought.

An animal identification tag has been found which does have improved retention characteristics. It is a tag for identification of animals comprising a portion for extending through the tissue of the animal and an identification means connected thereto, wherein the improvement comprises at least one perforation in said portion for extending through the tissue of the animal, said perforation allowing for animal tissue growth into said portion.

Perforation as used herein shall include any opening in the portion of the tag for extending through the tissue of the animal which will allow for tissue growth into said portion from the edges of the incision wound incurred in the process of attaching the tag. Examples include a single perforation or plurality of perforations extending completely or partially through said portion or a porous or reticulated structure forming tortuous pathways either through said portion for extending through said tissue or on its surface.

The perforation or perforations allow for tissue growth through the portion of tag extending through the animal's tissue which growth is involved in rehealing of the incision wound edges. If the perforations are not completely through the portion of the tag extending through the animal's tissue, tissue growth infiltrates from the wound edges into the interstices of the porous structure of the portion of the tag extending through the tissue of the animal. This tissue growth through and into the tag causes it to be locked into the tissue, thus greater retention is achieved.

Figure 2:
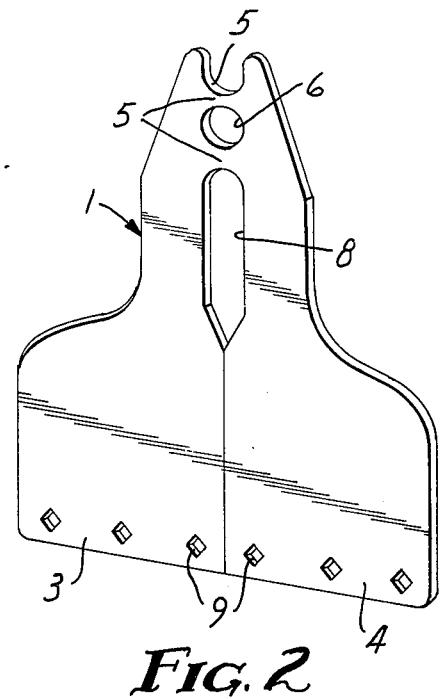
Figure 3:
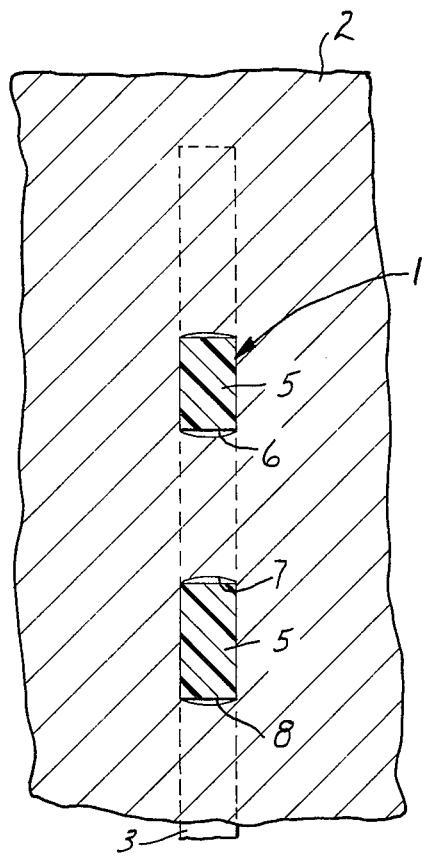

The invention will now be described with reference to the accompanying drawings which comprise:

FIG. 1 which is a perspective view of one embodiment of the tag of the present invention in a cow's ear;

FIG. 2 which is a perspective view of one embodiment of the tag of the present invention; and FIG. 3 which is a section taken across a line 3—3 in FIG. 1.

The animal identification tag 1 in the cow's ear 2 comprises two end members 3, 4 and portion or connecting means 5 extending through the cow's ear 2 containing perforation 6. End members 3, 4 are substantially coplanar with each other and with portion or connecting means 5. In this embodiment the perforation 6 passes entirely through portion or connecting means 5. Opening 8 is to allow for the portion of the cow's ear 2 that extends below portion 5 of the tag. Diamond-shaped holes 9 are supplied in the lower portion of each of the two end members 3, 4 as attaching means for the applicator tool, not shown.

FIG. 3 depicts a section of one embodiment of this invention in an animal's ear 2. Passing through the ear is portion or connecting means 5 containing perforation 6. The tissue growth through the perforation 6 is shown as 7. The tissue growth 7 is the result of rehealing of the edges of incision wound which was made when the tag was placed in the cow's ear.

The present invention, i.e., including at least one perforation in the portion of an animal identification tag which passes through the animal's tissue is applicable to all types of animal identification tags including, for example, those which attach to the brisket of the animal, those which attach to the ear of the animal, and those which attach to the shoulder or neck of the animal. Thus the present invention is applicable to the tags disclosed in the above-noted patents as well as to any other animal identification tag which has a portion thereof extending through the tissue of the animal. It may be desirable to modify the design of such tags to enhance apposition of wound edges through any perforation in the portion of the tag extending through the animal's tissue.

The portion of the tag for extending through the tissue of the animal can be the same as that of the remainder of the tag, i.e., a strong, resilient material such as polyurethane or nylon. The perforation or perforations can be placed in the tag by known methods including, for instance, punching, molding, etc. The perforations can also be placed in the portion of the tag for extending through the animal's tissue by incorporating within that portion a suitable inert and bioreceptive material such as a porous ceramic (U.S. Pat. No. 3,314,420), or woven or knit polyester of Teflon FEP fluorocarbon resin. In this instance all or a part of the portion of the tag extending through the animal's tissue will be a different material than the remainder of the tag. The inert and bioreceptive material is held in place by known methods such as cementing, heat bonding, or friction bonding.

A preferred embodiment of the present invention is that shown in FIGS. 1–3. This tag not only allows for improved retention via tissue growth through perforation 6, but also allows for easy viewing of the tag.

I claim:

1. A tag for identification of animals comprising a portion for extending through the tissue of the animal and an identification means connected thereto, the improvement which comprises porous ceramic in said portion for extending through the tissue of the animal, siad porous ceramic allowing for animal tissue growth into said porous ceramic of said portion.

* * * * *